US012752916B2

(12) United States Patent
Prampolini et al.

(10) Patent No.: US 12,752,916 B2
(45) Date of Patent: Oct. 6, 2026

(54) HYPERSONIC TRANSPORT SYSTEM

(71) Applicant: ARIANEGROUP SAS, Les Mureaux (FR)

(72) Inventors: Marco Prampolini, Le Haillan (FR); Jean-Philippe Dutheil, Le Haillan (FR); Yoan Boue, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/551,499

(22) PCT Filed: Mar. 17, 2022

(86) PCT No.: PCT/FR2022/050484
§ 371 (c)(1),
(2) Date: Sep. 20, 2023

(87) PCT Pub. No.: WO2022/200713
PCT Pub. Date: Sep. 29, 2022

(65) Prior Publication Data
US 2025/0074588 A1 Mar. 6, 2025

(30) Foreign Application Priority Data
Mar. 23, 2021 (FR) ........................................ 2102867

(51) Int. Cl.
*B64C 30/00* (2006.01)
*B64D 27/02* (2006.01)
*B64G 1/00* (2006.01)

(52) U.S. Cl.
CPC ............ *B64C 30/00* (2013.01); *B64D 27/023* (2013.01); *B64G 1/006* (2023.08)

(58) Field of Classification Search
CPC .......... B64C 30/00; B64D 27/023; B64G 1/14
See application file for complete search history.

(56) References Cited

U.S. PATENT DOCUMENTS

| | | | | |
|---|---|---|---|---|
| 6,257,527 B1 * | 7/2001 | Redding, Jr. | B64G 1/12 | 244/159.1 |
| 6,745,979 B1 | 6/2004 | Chen | | |
| 8,729,442 B2 * | 5/2014 | Boelitz | B64G 1/14 | 244/171.1 |
| 8,955,791 B2 * | 2/2015 | Smith | B64D 5/00 | 244/171.1 |
| 2003/0205640 A1 * | 11/2003 | Bowcutt | B64C 3/10 | 244/35 A |

(Continued)

FOREIGN PATENT DOCUMENTS

| | | | |
|---|---|---|---|
| CN | 107985626 B | 2/2021 | |
| EP | 2151730 A1 * | 2/2010 | G05D 1/101 |

OTHER PUBLICATIONS

"Space Hopping Hyperplane", Ann Parker, First Science 2014, http://firstscience.com/SITE/ARTICLES/hypersoar.asp (Year: 2014).*

(Continued)

*Primary Examiner* — Richard Green
*Assistant Examiner* — Katherine June Walter
(74) *Attorney, Agent, or Firm* — Bookoff McAndrews, PLLC

(57) ABSTRACT

Embodiments of the invention relate to a hypersonic transport system including: an aircraft which includes a hypersonic lift-to-drag ratio greater than or equal to 2.5, wherein the aircraft includes a secondary propulsion device and position sensors, and wherein the aircraft also includes a variably shaped aerodynamic surface; a main propulsion device which is removably attached to the aircraft; and a control unit which is configured to monitor the aircraft and the main propulsion device.

9 Claims, 3 Drawing Sheets

(56) References Cited

U.S. PATENT DOCUMENTS

| | | | | |
|---|---|---|---|---|
| 2010/0314497 | A1* | 12/2010 | Boelitz | B64G 1/14 701/99 |
| 2018/0118370 | A1* | 5/2018 | Millman | B64C 13/503 |
| 2018/0339793 | A1* | 11/2018 | Chaudhary | B64G 1/625 |
| 2019/0161214 | A1* | 5/2019 | Kobayakawa | B64G 1/28 |
| 2020/0002020 | A1* | 1/2020 | O'Brien | F02C 7/04 |
| 2021/0349474 | A1* | 11/2021 | Usuki | B64G 1/62 |
| 2022/0107160 | A1* | 4/2022 | Cerasuolo | G05D 1/107 |
| 2022/0204190 | A1* | 6/2022 | Alhubail | B64G 1/244 |

OTHER PUBLICATIONS

LLNL/DARPA Hypersoar, information post on simplerockets.com Aug. 27, 2022, https://www.simplerockets.com/c/G1Ogdc/LLNL-DARPA-Hypersoar#:~:text=Download%20Craft-,%C3%97,burnt%20up%20in%20the%20atmosphere. (Year: 2022).*

"Motion Sickness Susceptibility under Weightless and Hypergravity Conditions Generated by Parabolic Flight", Earl F. Miller II, Joint Report Naval Aerospace Medical Institude and NASA , Jan. 1969 (Year: 1969).*

Dai Pei et al. "Design and aerodynamic performance analysis of a variable-sweep-wing morphing waverider" Aerospace Science and Technology, Elsevier Masson, FR, vol. 98, Jan. 15, 2020 (Jan. 15, 2020), [retrieved on Jan. 15, 2020] DOI: 10.1016/J.AST.2020.105703 ISSN: 1270-9638, XP086057310.

Dick G J. "Waverider Aerodynamic Study Programme Amateur Research in Scotland" Proceedings of International Hypersonic Waver/Der Symposium, XX, XX, Oct. 17, 1990 (Oct. 17, 1990), pp. 1-18 XP009072463.

Search Report and Written Opinion issued in International Application No. PCT/FR2022/050484, issued on Jul. 4, 2022.

Search Report issued in French Application No. 21 002867, issued on Nov. 29, 2021.

* cited by examiner

[Fig. 1]
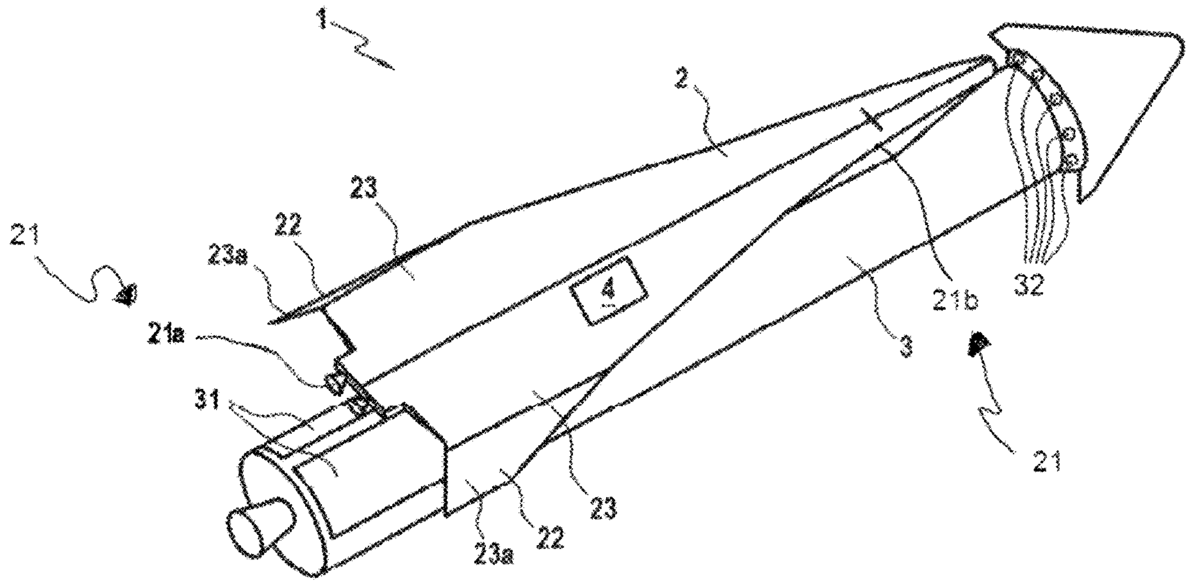
[Fig. 2]
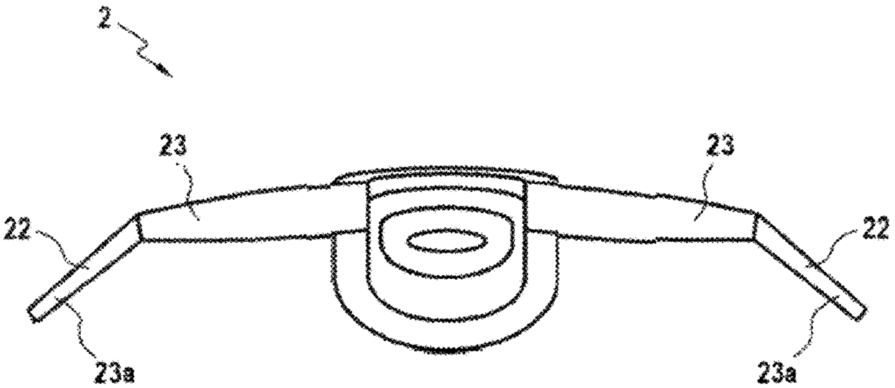

[Fig. 3]
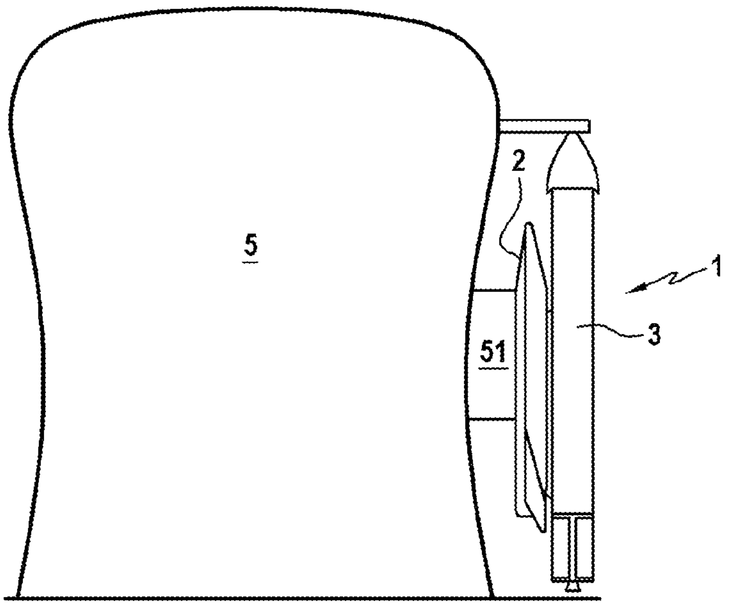
[Fig. 4]
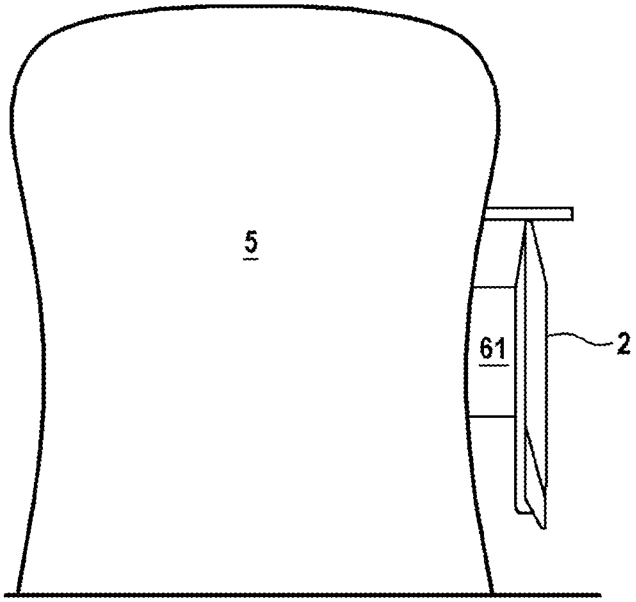

[Fig. 5]
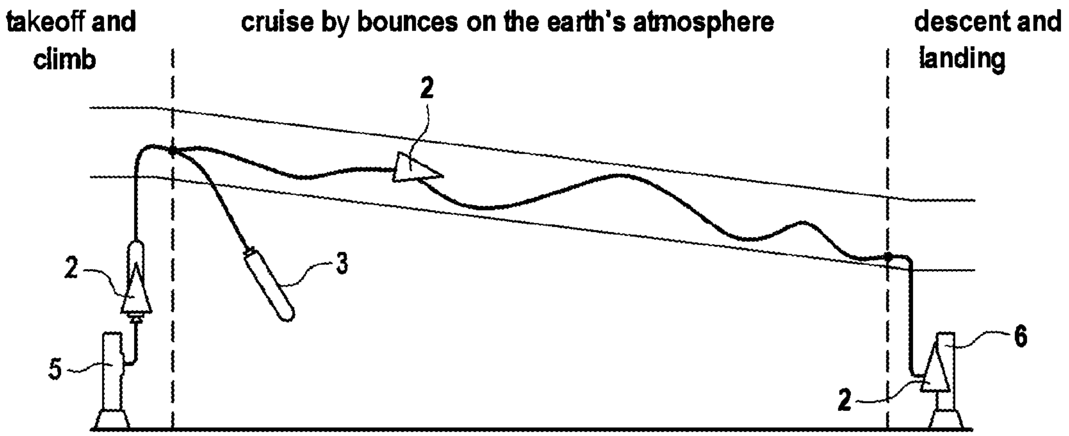

HYPERSONIC TRANSPORT SYSTEM

CROSS-REFERENCE TO RELATED APPLICATIONS

This is National Stage Application under 35 U.S.C. § 371 of International Application No. PCT/FR2022/050484, filed Mar. 17, 2022, now published as WO 2022/200713 A1, which claims priority to French Patent Application No. 2102867, filed on Mar. 23, 2021.

TECHNICAL FIELD

The invention relates to a hypersonic transport system, that is to say a system making it possible to reach a speed greater than 1,700 m/s. The invention relates in particular to a transport system with a propulsion system of the rocket engine type.

PRIOR ART

Currently, long journeys are usually made by plane. As the airliners generally fly at a speed comprised between 800 km/h and 900 km/h, making a journey of 6,000 km can thus take more than 7 hours. Furthermore, some very long-distance commercial flights, such as between Paris and Tokyo, can last more than 12 hours.

In addition, some very long distance flights may require a stopover to refuel the plane.

Thus, currently long journeys tend to monopolize at least a full day for travelers.

It is known from document U.S. Pat. No. 6,745,979, from article «<Waverider Aerodynamic Study Programme Amateur Research in Scotland», XP009082463, from article «Design and aerodynamic performance analysis of a variable-sweep-wing morphing waveride», XP086057310, and from document CN107985626, different hypersonic transport systems illustrating the state of the art.

DISCLOSURE OF THE INVENTION

The main purpose of the present invention is therefore to propose a transport solution making it possible to make long journeys in a short time.

According to a first aspect, the invention relates to a hypersonic transport system comprising:

- an aircraft that comprises a hypersonic lift-to-drag ratio greater than or equal to 2.5, the aircraft comprising a secondary propulsion device and position sensors, the aircraft also comprising a variably shaped aerodynamic surface;
- a main propulsion device which is removably attached to the aircraft;
- a control unit which is configured to monitor the aircraft and the main propulsion device so as to perform the following stages while keeping a load factor less than 1.5 G:
- a stage of taking off and climbing up to an altitude greater than or equal to 30 km with a speed greater than or equal to 3,000 m/s, the main propulsion device being separated from the aircraft at the end of the take-off and climb stage;
- a stage of cruising by bouncing off the Earth's atmosphere during which the control unit monitors the secondary propulsion device to maintain the speed of the aircraft and maintain a predefined trajectory of the aircraft;
- a descent and landing stage during which the control unit monitors the modification of the shape of the aerodynamic surface of the aircraft to perform a dissipative descent, the control unit then monitoring the secondary propulsion device to perform an active slowing down of the aircraft after the dissipative descent.

Such a system is in particular advantageous to make journeys of more than 6,000 km.

According to one possible characteristic, the control unit is configured to monitor the aircraft and the main propulsion device to ensure a vertical climb during the take-off and climb stage.

According to one possible characteristic, the control unit is configured to monitor the aircraft and the main propulsion device to ensure a vertical descent during the descent and landing stage.

According to one possible characteristic, the main propulsion device is a liquid propellant rocket engine.

According to one possible characteristic, the main propulsion device is a reusable liquid propellant rocket engine.

According to one possible characteristic, the secondary propulsion device comprises on the one hand a front propulsion assembly located at a front end of the aircraft, and on the other hand a rear propulsion assembly located at a rear end of the aircraft opposite to the forward end, the control unit being configured to monitor the secondary propulsion device to roll over the aircraft during the descent and landing stage.

According to one possible characteristic, the secondary propulsion device is a re-ignitable propulsion device.

According to one possible characteristic, the aircraft comprises wings, each of the wings comprising a movable end which forms a variably shaped aerodynamic surface.

BRIEF DESCRIPTION OF THE DRAWINGS

Other characteristics and advantages of the present invention will become apparent from the description given below, with reference to the appended drawings which illustrate one exemplary embodiment devoid of any limitation.

FIG. 1 schematically represents a hypersonic transport system with an aircraft attached to a booster of a main propulsion device.

FIG. 2 schematically represents a front view of the aircraft of FIG. 1.

FIG. 3 schematically represents the hypersonic transport system of FIG. 1 which is positioned on a take-off station.

FIG. 4 schematically represents the hypersonic transport system of FIG. 1 which is positioned on a landing station.

FIG. 5 schematically represents the different phases of a flight of the hypersonic transport system.

DESCRIPTION OF THE EMBODIMENTS

As illustrated in FIG. 1, a hypersonic transport system 1 comprises an aircraft 2 as well as a main propulsion device 3 on which the aircraft 2 is mounted. The aircraft 2 has the function of receiving passengers and transporting them from a departure station to an arrival station. The main propulsion device 3 has the function of providing most of the thrust necessary to make the journey between the departure station and the arrival station.

The main propulsion device 3 can for example be a solid propulsion device, or a liquid propulsion device. The main propulsion device 3 can thus be a solid propellant rocket engine, or a liquid propellant rocket engine. Preferably, the main propulsion device 3 is reusable, that is to say the main propulsion device 3 can be recovered and restored in order to be used for several missions. In order to ensure the recovery of the main propulsion device 3, said main propulsion device 3 may comprise deployable flaps 31 and rollover thrusters 32 located at a front end of the main propulsion device 3. The flaps 31 and the rollover thrusters 32 ensure the monitoring of the descent and landing of the main propulsion device 3.

The main propulsion device 3 is removably attached to the aircraft 2, thus allowing the main propulsion device 3 to be detached from the aircraft 2 when the main propulsion device 3 mission is completed. The attachment between the main propulsion device 3 and the aircraft 2 can for example be made by explosive bolting.

The aircraft 2 comprises a secondary propulsion device 21 which is configured to propel and participate in the monitoring of the trajectory of the aircraft 2. The thrust provided by the secondary propulsion device 21 is lower than the thrust provided by the main propulsion device 3. Preferably, the secondary propulsion device 21 is a re-ignitable propulsion system, thus making it possible to ignite the secondary propulsion device 21 on an ad hoc basis in order to provide thrust to the aircraft 2 on an ad hoc basis. The propulsion device 21 can for example be a liquid propellant rocket engine.

The aircraft 2 also comprises position sensors which make it possible to determine the position of the aircraft 2 during the different stages of the flight of the transport system 1.

The aircraft 2 also comprises a variably shaped aerodynamic surface 22 which makes it possible to monitor the shape of the aircraft 2 during the different stages of the flight of the transport system 1, thus making it possible to monitor the speed and the trajectory of the aircraft 2. As visible in FIGS. 1 and 2, the variably shaped aerodynamic surface 22 can be formed by a movable end 23*a* of the wings 23 of the aircraft 2 which can be lowered or raised in order to vary the shape of the wings 23.

In order to monitor the different elements of the transport system 1, a control unit 4 is connected to the aircraft 2 and to the main propulsion device 3. The control unit 4 comprises on the one hand a memory on which a method for monitoring the transport system 1 is recorded, and on the other hand a processor configured to implement the method.

As illustrated in FIG. 5, the control unit 4 is configured to monitor the transport system 1 in order to implement the following stages:

- a stage of taking off and climbing to an altitude greater than or equal to 30 km with a speed greater than or equal to 3,000 m/s. The thrust provided during this take-off and climb stage is provided by the main propulsion device 3. At the end of the take-off and climb stage, the main propulsion device 3 is detached from the aircraft 2, and can then be recovered if the propulsion device 3 is reusable. This stage makes it possible to climb to a sufficient altitude and to give the aircraft 2 sufficient speed to implement the following stage of cruising by bouncing off the Earth's atmosphere.
- a stage of cruising by bouncing off the Earth's atmosphere during which the control unit 4 monitors the secondary propulsion device 21 to maintain the speed of the aircraft 2 and the predefined trajectory of the aircraft 2 according to the destination of the aircraft 2. The secondary propulsion device 21 is activated in order to ensure that the aircraft 2 has sufficient speed to bounce off the Earth's atmosphere. The secondary propulsion device 21 is also activated in order to monitor the size of bounces, which thus influences the trajectory of the aircraft 2. The activation of the secondary propulsion device 21 can be an ad hoc activation, for example activation before a bounce. During this cruise stage, the aircraft 2 loses altitude relative to the injection point. The speed of the aircraft 2 at the end of this cruise stage may be lower than the injection speed of the aircraft 2 at the end of the take-off and climb stage.
- a stage of descent and landing at the destination point during which the control unit 4 monitors the modification of the shape of the variably shaped aerodynamic surface 22 of the aircraft 2 in order to perform a dissipative descent, the control unit 4 then monitoring the secondary propulsion device 21 to perform an active slowing down of the aircraft after the dissipative descent phase. A dissipative descent is a free fall in which the aircraft 2 slows down by dissipation with the friction of the Earth's atmosphere, the shape of the aircraft 2 being modified during this dissipative descent stage in order to give a shape that increases the dissipation of kinetic energy, this shape not being suitable for the other stages and in particular the stage of cruising by bouncing off the atmosphere.

As illustrated in FIG. 5, a maneuver of rollover of the aircraft 2 can be performed to perform the active slowing down of the aircraft 2 by the secondary propulsion device 21 in order to direct said secondary propulsion device 21 in the direction of the ground and thus generate a thrust opposite to the movement of the aircraft to slow it down. In order to ensure a rollover of the aircraft 2 during the descent and landing stage, the secondary propulsion device 21 may comprise on the one hand a front propulsion assembly 21*b* located at a front end of the aircraft 2, and on the other hand a rear propulsion assembly 21*a* located at a rear end of the aircraft 2 opposite to the front end, the control unit 4 monitoring the front propulsion assembly and the rear propulsion assembly in order to ensure the rollover of the aircraft.

The fact of performing a dissipative descent before performing an active slowing down of the aircraft makes it possible to smooth the slowing down of the aircraft 2, and also makes it possible to perform the maneuvers for the active slowing down via the secondary propulsion device 21 at a lower speed, and therefore with a lower load factor for passengers. Furthermore, such a dissipative descent phase makes it possible to reduce the amount of fuel necessary for the secondary propulsion device 2 to actively slow down the aircraft.

In order to allow the aircraft 2 to perform bounces off the Earth's atmosphere after its injection at an altitude of at least 30 km and at least 3,000 m/s, the aircraft 2 has a hypersonic lift-to-drag ratio greater than or equal to 2.5. A hypersonic lift-to-drag ratio of 2.5 corresponds to a shape that can ensure an advance of 2.5 meters for each 1 meter of altitude descended, at a speed from 1,700 m/s (Mach 5).

The fact that the aircraft 2 is injected at an altitude greater than or equal to 30 km with a speed greater than or equal to 3,000 m/s, in combination with the lift-to-drag ratio of the aircraft 2, this allows the aircraft 2 to bounce off the Earth's atmosphere. Furthermore, at an altitude of at least 30 km, fuel consumption is reduced because the air density is lower. According to one possible variant, the altitude at which the aircraft 2 is injected at the end of the take-off and climb stage is comprised between 30 km and 80 km. According to one possible variant, the speed at which the aircraft 2 is injected at the end of the take-off and climb stage is comprised between 3,000 m/s and 6,000 m/s.

Furthermore, in order to accommodate passengers on flights with current commercial planes, that is to say passengers who have not undergone special training, the control unit 4 monitors the transport system 1 in order to keep a positive load factor less than 1.5 G during the different transport stages. Thus, the control unit 4 monitors the acceleration and the trajectory of the transport system 1 in order to keep a positive load factor less than 1.5 G, and preferably with the lowest possible oscillation between 0.7 G and 1.5 G, even if possible with a load factor equal to 1 G±0.3 G.

Advantageously, as illustrated in FIG. 5, the climb of the transport system 1 during the take-off and climb stage is vertical. By vertical climb it is understood here a climb with an angle less than or equal to 15° with respect to the vertical axis. The fact that the climb of the transport system 1 is vertical allows the shock wave caused by the passage to Mach 1 to be directed horizontally and not towards the ground, thus greatly reducing noise pollution on the ground.

Similarly, as illustrated in FIG. 5, the descent of the aircraft 2 can be vertical during the descent and landing stage. By vertical descent it is understood here a descent with an angle less than or equal to 15° with respect to the vertical axis. The fact that the descent of the transport system 1 is vertical again allows the shock wave created to be directed horizontally and not towards the ground, thus greatly reducing noise pollution on the ground.

FIG. 3 schematically represents the transport system 1 which is installed on a take-off base 5. The take-off base 5 illustrated in FIG. 3 is a base adapted for a vertical take-off and climb of the transport system 1. The take-off base 5 comprises a connection ramp 51 which connects the take-off base 5 to the aircraft for the passengers to be able to embark. In the event that the main propulsion device 3 is reusable and is recovered, the main propulsion device 3 can return to the take-off base 5 after being detached from the aircraft 2 at the end of the take-off and climb stage.

FIG. 4 schematically represents the aircraft 2 which is installed on a landing base 6. The landing base 6 illustrated in FIG. 4 is a base adapted for a vertical descent and landing of the aircraft 2. The landing base 6 comprises a connection ramp 61 which connects the landing base 6 to the aircraft 2 for the passengers to be able to disembark.

The invention claimed is:

1. A hypersonic transport system for transport of passengers in a commercial flight comprising:

an aircraft comprising a secondary propulsion device and position sensors, wherein the aircraft also comprises a variably shaped aerodynamic surface;

a main propulsion device which is removably attached to the aircraft; and a control unit which is configured to control the aircraft and the main propulsion device so as to perform the following stages while keeping a positive load factor less than 1.5 G and more than 0.7 G:

a take-off and climb stage until reaching, at the end of the latter, an altitude greater than or equal to 30 km and a speed greater than or equal to 3,000 m/s, the main propulsion device being separated from the aircraft at the end of the take-off and climb stage;

a stage of cruising by bouncing off the earth's atmosphere during which the control unit operates the secondary propulsion device to maintain a predefined trajectory of the aircraft and to actively maintain the positive load factor to be more than 0.7 G, thereby preventing periods of near-weightlessness during said bouncing; and a descent and landing stage during which the control unit controls a modification of the shape of the variably shaped aerodynamic surface of the aircraft to perform a dissipative descent such that the secondary propulsion device is not active during the dissipative descent, the control unit then controlling the secondary propulsion device to perform a rollover and an active slowing down of the aircraft after the dissipative descent, wherein the control unit is configured to adjust acceleration and trajectory to keep a positive load factor less than 1.5 G and more than 0.7 G.

2. The transport system according to claim 1, wherein the control unit is configured to control the aircraft and the main propulsion device to ensure a vertical climb during the take-off and climb stage.

3. The transport system according to claim 1, wherein the control unit is configured to control the aircraft and the secondary propulsion device to ensure a vertical descent during the descent and landing stage.

4. The transport system according to claim 1, wherein the main propulsion device is a liquid propellant rocket engine.

5. The transport system according to claim 4, wherein the main propulsion device is a reusable liquid propellant rocket engine.

6. The transport system according to claim 1, wherein the secondary propulsion device comprises a front propulsion assembly located at a front end of the aircraft, and a rear propulsion unit located at a rear end of the aircraft opposite to the front end, the control unit being configured to monitor the secondary propulsion device to roll over the aircraft during the descent and landing stage.

7. The transport system according to claim 1, wherein the secondary propulsion device is a re-ignitable propulsion device.

8. The transport system according to claim 1, wherein the aircraft comprises wings, each of the wings comprising a movable end which forms a variably shaped aerodynamic surface.

9. The transport system according to claim 1, wherein the main propulsion device further comprises a rollover thruster disposed on a front end of the main propulsion device.

* * * * *